United States Patent
Mahoney et al.

(10) Patent No.: US 6,450,799 B1
(45) Date of Patent: Sep. 17, 2002

(54) COHERENT JET SYSTEM USING LIQUID FUEL FLAME SHROUD

(75) Inventors: William John Mahoney, Dobbs Ferry; John Erling Anderson, Somers, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/000,469

(22) Filed: Dec. 4, 2001

(51) Int. Cl.⁷ ............................ F23J 7/00; C21C 5/32
(52) U.S. Cl. .................. 431/8; 431/181; 431/187; 266/222; 266/225
(58) Field of Search ............... 431/187, 8, 9, 431/278, 158, 159, 350, 351, 181; 239/424.5, 426, 418; 266/225, 268, 47; 75/414, 10.4, 708

(56) References Cited

U.S. PATENT DOCUMENTS

| | | | |
|---|---|---|---|
| 3,427,151 A | 2/1969 | Koudelka et al. | 75/59 |
| 4,622,007 A | 11/1986 | Gitman | 432/13 |
| 5,714,113 A | 2/1998 | Gitman et al. | 266/182 |
| 5,814,125 A | 9/1998 | Anderson et al. | 75/414 |
| 5,823,762 A | 10/1998 | Anderson et al. | 431/8 |
| 6,096,261 A | 8/2000 | Anderson et al. | 266/225 |
| 6,125,133 A | 9/2000 | Mathur et al. | 373/8 |
| 6,139,310 A | 10/2000 | Mahoney et al. | 431/8 |
| 6,142,764 A | 11/2000 | Anderson et al. | 431/8 |
| 6,171,544 B1 | 1/2001 | Anderson et al. | 266/47 |
| 6,176,894 B1 | 1/2001 | Anderson et al. | 75/414 |
| 6,241,510 B1 | 6/2001 | Anderson et al. | 431/8 |
| 6,254,379 B1 | 7/2001 | Bool, III et al. | 431/4 |
| 6,261,338 B1 | 7/2001 | Mahoney et al. | 75/414 |
| 6,383,445 B1 * | 5/2002 | Anerson et al. | 266/225 |

* cited by examiner

Primary Examiner—James C. Yeung
(74) Attorney, Agent, or Firm—Stanley Ktorides

(57) ABSTRACT

A method and apparatus for establishing one or more coherent jets from a lance wherein liquid fuel is provided into a recession on the lance face along with motive gas, and is used to generate a flame shroud to maintain jet coherency.

15 Claims, 2 Drawing Sheets

COHERENT JET SYSTEM USING LIQUID FUEL FLAME SHROUD

TECHNICAL FIELD

This invention relates generally to coherent jet technology.

BACKGROUND ART

A recent significant advancement in the field of gas dynamics is the development of coherent jet technology which produces a laser-like jet of gas which can travel a long distance while still retaining substantially all of its initial velocity and with very little increase to its jet diameter. One very important commercial use of coherent jet technology is for the introduction of gas into liquid, such as molten metal, whereby the gas lance may be spaced a large distance from the surface of the liquid, enabling safer operation as well as more efficient operation because much more of the gas penetrates into the liquid than is possible with conventional practice where much of the gas deflects off the surface of the liquid and does not enter the liquid.

In a coherent gas jet system one or more gas jets are surrounded by a flame envelope or flame shroud to maintain coherency of the gas jet or jets over a long distance from the injection lance. The flame shroud is produced by combusting oxidant with gaseous fuel such as methane or natural gas. In some situations it may be desirable to use liquid fuel instead of gaseous fuel to generate the flame shroud. For example, liquid fuel may be preferred to gaseous fuel in areas where gaseous fuel is not regularly available on a consistent basis and/or in areas where the cost of gaseous fuel is high relative to liquid fuel. Unfortunately, the straightforward substitution of liquid fuel for gaseous fuel in a coherent gas jet system does not yield satisfactory results regarding the coherent jets.

Accordingly it is an object of this invention to provide a system for producing a coherent gas jet which can effectively employ liquid fuel to generate the requisite flame shroud.

SUMMARY OF THE INVENTION

The above and other objects, which will become apparent to those skilled in the art upon a reading of this disclosure, are attained by the present invention, one aspect of which is:

A method for producing a coherent gas jet comprising:

(A) passing at least one gas jet from at least one nozzle into an injection volume, said nozzle(s) housed in a lance having a lance face and communicating with the injection volume at the lance face;

(B) passing liquid fuel into a recession on the lance face, said recession being around the nozzle(s);

(C) passing motive gas into the recession, creating a flow of liquid fuel within the recession, atomizing the liquid fuel, and passing atomized liquid fuel out from the recession into the injection volume annularly to the gas jet(s); and (D) passing oxidant into the injection volume and combusting the oxidant with atomized liquid fuel to produce a flame shroud around the gas jet(s).

Another aspect of the invention is:

A coherent jet lance apparatus comprising:

(A) a lance having a lance face and having a least one nozzle having an opening at the lance face;

(B) a recession on the lance face around the nozzle opening(s);

(C) means for providing liquid fuel into the recession, and means for providing motive gas into the recession to atomize liquid fuel within the recession; and (D) means for passing oxidant from the lance positioned radially outward of the recession.

As used herein the term "lance face" means the surface of a lance abutting an injection volume.

As used herein the term "coherent jet" means a gas jet which is formed by ejecting gas from a nozzle and which has a velocity and momentum profile along a length of at least 20d, where d is the exit diameter of the nozzle, which is similar to its velocity and momentum profile upon ejection from the nozzle. Another way of describing a coherent jet is a gas jet which has little or no change in its diameter for a distance of at least 20d.

As used herein the term "length" when referring to a coherent gas jet means the distance from the nozzle from which the gas is ejected to the intended impact point of the coherent gas jet or to where the gas jet ceases to be coherent.

DETAILED DESCRIPTION

The invention will be described in detail with reference to the Drawings.

Figure 1:
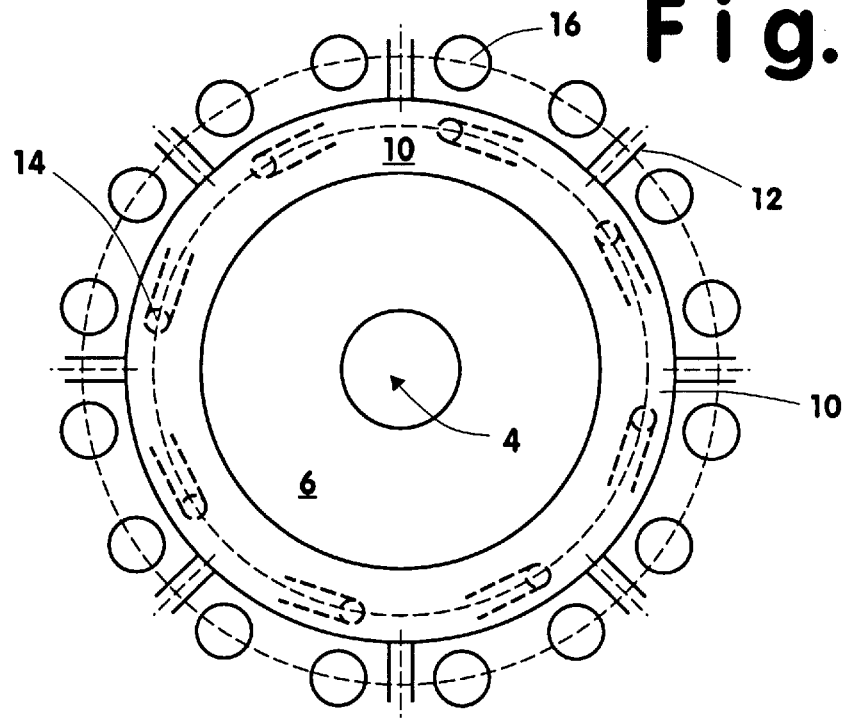
FIG. 1 is a head on view of one preferred embodiment of a lance face.
Figure 2:
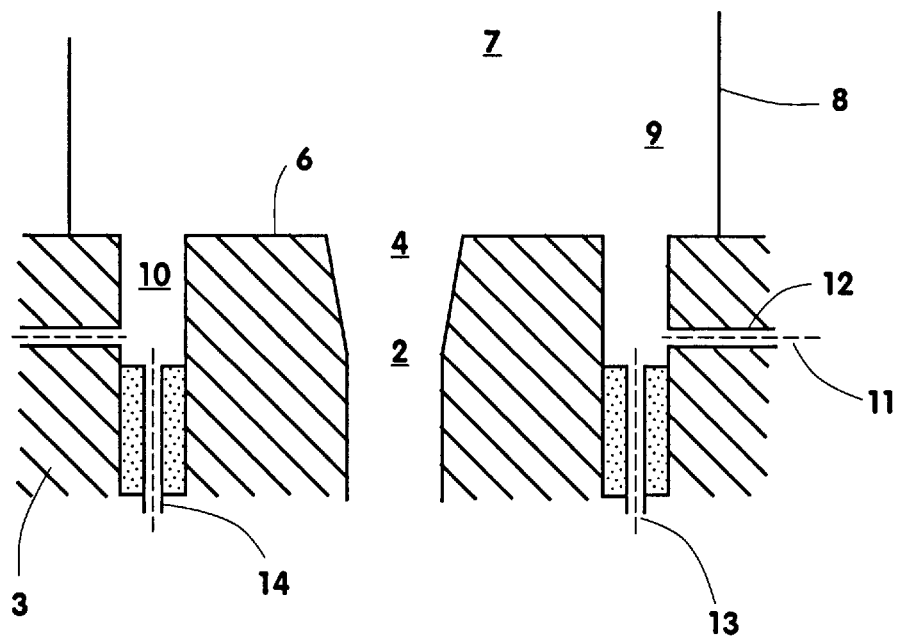
FIG. 2 is a cross sectional view of one preferred embodiment of a lance having such lance face which may be used in the practice of this invention.
Figure 3:
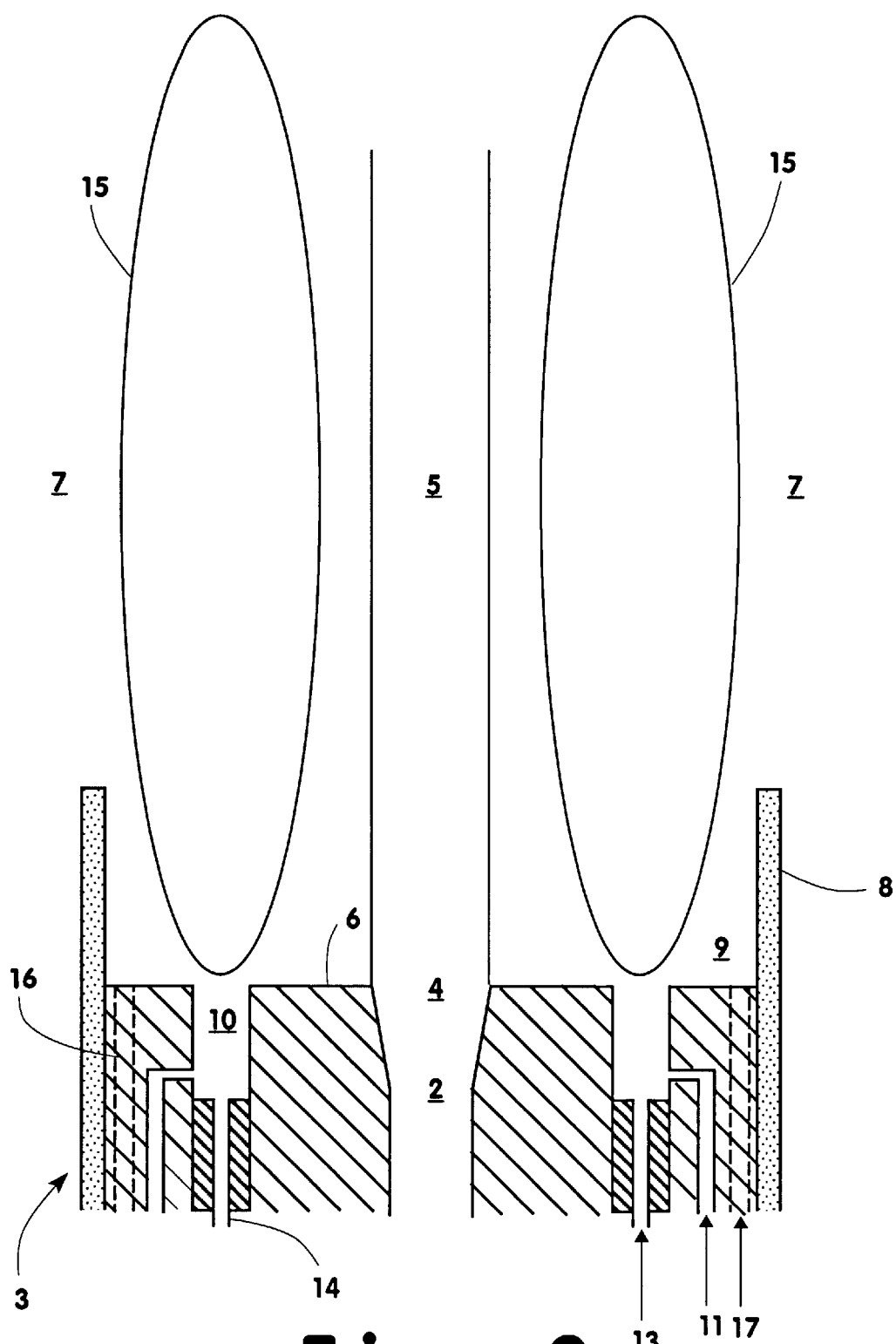
FIG. 3 illustrates the embodiment of the invention illustrated in FIGS. 1 and 2 in operation. The numerals in the Drawings are the same for the common elements.

Referring now to FIGS. 1, 2 and 3, gas as shown by flow arrow 1, is passed through a nozzle 2, preferably a converging/diverging nozzle, and then out from lance 3 through nozzle opening 4 on lance face 6 to form a coherent gas jet stream 5 in injection volume 7. Typically the velocity of the gas stream is within the range of from 700 to 3000 feet per second (fps). Preferably the velocity of the gas stream is supersonic when it is formed upon ejection from the lance face and remains supersonic for a distance of at least 20d. Although the Drawings illustrate an embodiment employing only one coherent gas jet injected from the lance through only one nozzle, more than one coherent gas jet may be injected from the lance through respective nozzles in the practice of this invention. When more than one coherent gas jet from the lance are employed, generally the number of such coherent gas jets is within the range of from 2 to 6.

Any effective gas may be used as the gas for forming coherent jets in the practice of this invention. Among such gases one can name oxygen, nitrogen, argon, carbon dioxide, hydrogen, helium, steam and hydrocarbon gases. Also mixtures comprising two or more gases, e.g. air, may be used as such gas in the practice of this invention.

As illustrated in the Drawings, lance 3 preferably has an extension 8 which extends out from lance 3 to form recirculation zone 9 within injection volume 7 for the receipt of liquid fuel and gas from lance 3. The gas is provided out from lance 3 axially into recirculation zone 9 to form coherent gas jet 5. In the embodiment of the invention illustrated in FIG. 3, the gas is provided absolutely in line with the centerline or main axis of lance 3. The centerline or main axis of lance 3 may be imagined by extending flow arrow 1 for the entire axial length of lance 3.

A recession 10 is positioned on the lance face around the nozzle opening(s) 4 preferably, as shown in FIG. 1, in a circle completely around the nozzle opening(s) 4. Liquid fuel 11 such as pitch, tar, any and all grades of fuel oil, kerosene, and jet fuel is provided into recession or groove 10 by means of at least one liquid fuel passage 12. Generally from 1 to 16 fuel passages are used to provide liquid fuel 11 into recession 10. The liquid fuel passages may be equispaced around recession 10. The liquid fuel 11 is provided into recession 10 at a total flowrate from passage(s) 12 generally within the range of from 5 to 150 gallons per hour (gph). The liquid fuel may be provided into recession 10 from passage(s) 12 in a substantially parallel direction with lance face 6 wherein substantially parallel means within the range of from plus to minus 30 degrees of absolutely parallel. However the liquid fuel may be provided into recession 10 at any effective angle. Generally lance face 6 is oriented substantially perpendicular to the centerline or main axis of lance 3.

Motive gas 13 is passed into recession 10 through one or more motive gas passages 14 which, if more than one motive gas passage 14 is employed, are preferably equispaced around recession 10. The motive gas is preferentially provided into recession 10 at an angle sufficient to causing a swirling flow of liquid fuel within the recession. The swirling flow serves to distribute the liquid fuel and to keep the recession free of carbon buildup. The motive gas also serves to atomize the liquid fuel. Typically the motive gas 13 is provided into recession 10 from passage(s) 14 at an angle within the range of from 0 to 60 degrees with respect to a normal to the bottom wall of recession 10. The motive gas 13 is provided into recession 10 at a total flowrate from passage(s) 14 generally within the range of from 200 to 4000 standard cubic feet per hour (scfh). Although any effective gas may be used as the motive gas in the practice of this invention, preferably the motive gas is an oxidant such as air, oxygen-enriched air having an oxygen concentration exceeding that of air, or commercial oxygen having an oxygen concentration of at least 90 mole percent. Most preferably the motive gas is an oxidant having an oxygen concentration of at least 25 mole percent. Other gases such as nitrogen and steam may be used as the motive gas. Most preferably the velocity of the motive gas provided into the recession is sonic.

The preferential swirling flow of the liquid fuel caused by the angular provision of the motive gas into the recession serves to atomize and to substantially evenly distribute the liquid fuel within the recession. This enhances the integrity of the subsequently formed flame shroud or flame envelope around the gas jet(s), and also serves to minimize or eliminate carbon build up within groove or recession 10 which would diminish the effectiveness of the recession. Typically the depth of groove or recession 10 is within the range of from 0.25 to 2 inches.

The liquid fuel and the motive gas are passed into the injection volume 7, preferably into the recirculation zone 9 of injection volume 7, annularly, i.e. around, gas jet(s) 5. In the preferred embodiment of the invention illustrated in FIG. 3 wherein the motive gas is an oxidant, the liquid fuel and the oxidant motive gas combust within recirculation zone 9 to form flame envelope 15 around gas jet(s) 5. The use of the lance extension 8, which typically extends from 1 to 10 inches from lance face 6, to form recirculation zone 9 promotes the gasification of the atomized liquid fuel and the stability of the flame envelope formed by the combustion of the gasified liquid fuel.

Secondary or shroud oxidant, which may be air, oxygen-enriched air or commercial oxygen, is passed out from lance 3 into injection volume 7, preferably into recirculation zone 9 of injection volume 7, through one or more secondary oxidant provision means 16 positioned on lance 3 radially outward of recession 10. When extension 8 is employed, extension 8 is positioned radially outward of recession 10 and also radially outward of the secondary oxidant provision means 16. The secondary oxidant is typically passed out from lance 3 at a flowrate within the range of from 500 to 10,000 scfh. The secondary oxidant mixes with and combusts with the atomized liquid fuel in injection volume 7 forming a flame envelope 15 around gas jet(s) 5 within injection volume 7 which is typically a furnace zone. Flame envelope 15 around gas stream(s) 5 serves to keep injection volume gas from being drawn into the gas stream(s) 5, thereby keeping the velocity of gas stream(s) 5 from significantly decreasing and keeping the diameter of the gas stream(s) 5 from significantly increasing, for a distance of at least 20d.

A series of tests were conducted using apparatus similar to that illustrated in the Drawings. The test conditions and results are presented for illustrative purposes and are not intended to be limiting. In each of the tests the main gas was commercial oxygen having a purity of 99.5 mole percent and was provided into the recirculation zone from a converging/diverging nozzle having a throat diameter of 0.62 inch and an exit diameter of 0.81 inch at a flowrate of 36000 scfh and a velocity of 1600 fps. The liquid fuel was No. 2 fuel oil and was provided into the recession through 8 liquid fuel passages at a flowrate of 35 gph. The motive gas was commercial oxygen and was provided into the recession through 8 motive gas passages angled 30 degrees from the normal at a flowrate of from 1000 to 2000 scfh. The secondary oxidant was commercial oxygen and was provided into the injection volume through 16 holes on a 3$\frac{5}{16}$ inch diameter circle on the lance face at a flowrate of from 1000 to 6000 scfh. The extension had an inside diameter of 3.5 inches and measured 6 inches from the lance face. The coherent jets established under these conditions measured about 45 inches in length which is comparable to the length of a coherent jet established using known structures and using similar conditions but using natural gas to form the flame envelope.

Although the invention has been described in detail with reference to a certain preferred embodiment, those skilled in the art will recognize that there are other embodiments of the invention within the spirit and the scope of the claims.

What is claimed is:

1. A method for producing a coherent gas jet comprising:
   (A) passing at least one gas jet from at least one nozzle into an injection volume, said nozzle(s) housed in a lance having a lance face and communicating with the injection volume at the lance face;
   (B) passing liquid fuel into a recession on the lance face, said recession being around the nozzle(s);
   (C) passing motive gas into the recession, creating a flow of liquid fuel within the recession, atomizing the liquid fuel, and passing atomized liquid fuel out from the recession into the injection volume annularly to the gas jet(s); and
   (D) passing oxidant into the injection volume and combusting the oxidant with atomized liquid fuel to produce a flame shroud around the gas jet(s).

2. The method of claim 1 wherein the motive gas comprises oxygen.

3. The method of claim 1 wherein one gas jet is provided from one nozzle into the injection volume.

4. The method of claim 1 wherein the liquid fuel comprises fuel oil.

5. The method of claim 1 wherein the gas jet(s) is provided into the injection volume at a supersonic velocity.

6. The method of claim 1 wherein the flow of liquid fuel within the recession is swirling flow.

7. The method of claim 1 wherein the liquid fuel is passed into the recession in a substantially parallel direction with the lance face.

8. The method of claim 1 wherein the motive gas is provided into the recession at an angle of up to 60 degrees with respect to a normal to the bottom of the recession.

9. The method of claim 1 wherein the motive gas is provided into the recession at a sonic velocity.

10. A coherent jet lance apparatus comprising:
   (A) a lance having a lance face and having a least one nozzle having an opening at the lance face;
   (B) a recession on the lance face around the nozzle opening(s);
   (C) means for providing liquid fuel into the recession, and means for providing motive gas into the recession to atomize liquid fuel within the recession; and
   (D) means for passing oxidant from the lance positioned radially outward of the recession.

11. The lance apparatus of claim 10 wherein the recession is completely around the nozzle opening(s).

12. The lance apparatus of claim 10 wherein the recession has a depth within the range of from 0.25 to 2.0 inches.

13. The lance apparatus of claim 10 wherein the motive gas provision means provides the motive gas into the recession at an angle of up to 60 degrees with respect to a normal to the bottom of the recession.

14. The lance apparatus of claim 10 further comprising an extension extending from the lance face and positioned on the lance radially outward of the recession.

15. The lance apparatus of claim 10 wherein the means for providing liquid fuel into the recession provides the liquid fuel into the recession in a substantially parallel direction with the lance face.

\* \* \* \* \*